United States Patent [19]

Gunderson et al.

[11] Patent Number: 4,591,841

[45] Date of Patent: May 27, 1986

[54] LONG RANGE OPTICAL POINTING FOR VIDEO SCREENS

[75] Inventors: Jon Gunderson; David P. Kelso; Gregg Vanderheiden, all of Madison, Wis.

[73] Assignee: Wisconsin Alumni Research Foundation, Madison, Wis.

[21] Appl. No.: 547,869

[22] Filed: Nov. 1, 1983

[51] Int. Cl.$^4$ ............................................. G09G 1/16
[52] U.S. Cl. .................................. 340/707; 340/712; 178/18
[58] Field of Search ............... 340/706, 707, 708, 712, 340/715; 178/18

[56] References Cited

U.S. PATENT DOCUMENTS

| | | | |
|---|---|---|---|
| 3,247,391 | 4/1966 | Ogle . | |
| 3,497,701 | 2/1970 | Dalton . | |
| 3,506,875 | 4/1970 | Watanabe | 340/707 |
| 3,512,037 | 7/1970 | Eckert | 340/707 |
| 3,586,861 | 6/1971 | Wernikoff . | |
| 3,680,078 | 7/1972 | Baskin . | |
| 3,825,746 | 7/1974 | Kendler . | |
| 3,891,890 | 6/1975 | Yasuda . | |
| 3,917,955 | 11/1975 | Inulya . | |
| 3,997,891 | 12/1976 | Iwamura . | |
| 4,093,947 | 6/1978 | Habeger | 178/18 |
| 4,209,255 | 6/1980 | Heynau . | |
| 4,263,592 | 4/1981 | Takahashi . | |
| 4,275,395 | 6/1981 | Dewey . | |
| 4,277,783 | 7/1981 | Sampieri | 340/707 |
| 4,329,684 | 5/1982 | Monteath | 340/712 |
| 4,340,878 | 7/1982 | Spooner | 340/712 |
| 4,367,465 | 1/1983 | Mati | 340/712 |
| 4,377,810 | 3/1983 | Wolff | 340/707 |
| 4,395,707 | 7/1983 | Satrapa | 340/707 |
| 4,454,417 | 6/1984 | May | 340/707 |
| 4,472,710 | 9/1984 | Suzuki | 340/707 |

FOREIGN PATENT DOCUMENTS 21928  1/1981  European Pat. Off. ............ 340/707

OTHER PUBLICATIONS

Direct Access Video Keyboard Control System (DAVK), NIHR Progress Reports, Bulletin of Prosthetics Research BPR 10-33 (vol. 17, No. 1), Spring 1980, pp. 124–125.
Gregg C. Vanderheiden, Hybrid Optical Head Pointing Technique, Fifth Annual Conference on Rehabilitation Engineering, Houston, Texas, 1982, p. 24.
LP-15 Precision Light Pen advertising sheet.
DT 170 advertising brochure by Design Technology.
DT 170M "Advanced Light Pen" product description by Design Technology (1983).

*Primary Examiner*—John W. Caldwell, Sr.
*Assistant Examiner*—Michael F. Heim
*Attorney, Agent, or Firm*—Isaksen, Lathrop, Esch, Hart & Clark

[57] ABSTRACT

A long range optical pointing apparatus (10) is disclosed which can locate a spot (24) on a video screen (16) from a position several feet away from the screen. An optical pointer unit (11) focuses a portion of the raster lines traced over the video screen during one frame onto a photodetector (28), and provides an output pulse when a raster line is focused upon and detected by the photodetector. The detected raster line pulses are provided to a processing unit (13) which also receives the vertical and horizontal deflection signals from the video terminal (15). The processing circuitry (13) averages the positions of the group of raster line portions detected by the optical pointer unit to provide an averaged vertical and horizontal position for the area of the screen at which the pointer (11) is directed. The vertical and horizontal information provided by the processing circuitry can be used by a computer (19) to provide a cursor at the spot (24) on the video screen (16) to inform the user of the position on the screen at which he is pointing. The optical pointer unit (11) can be worn on the head of a user seated before the video terminal (15) so that communication with the computer (19) through the video screen can be accomplished with head pointing movements.

23 Claims, 11 Drawing Figures

Microfiche Appendix Included
(1 Microfiche, 20 Pages)

LONG RANGE OPTICAL POINTING FOR VIDEO SCREENS

This invention was made with Government support under Grant Nos. G008200049 and G008300045 awarded by the U.S. Department of Education. The Government has certain rights in this invention.

This application includes a microfiche appendix listing of a computer program having 20 frames.

TECHNICAL FIELD

This invention pertains generally to the field of light pen systems used in conjunction with a cathode ray tube video screen to communicate with a computer.

BACKGROUND ART

Light pens are used with cathode ray tube (CRT) displays as input-output devices for computers in a variety of applications. A light pen held against the video screen detects the flash of light from the scanning electron beam as it passes the pen. The signal from the light pen can be compared with the vertical and horizontal deflection signals of the CRT to determine the location of the pen at the time that the electron beam passed by it. This location information can then be used by a computer to provide an interactive graphics display on the screen. For example, the light pen user can issue a command to the computer by pointing to a particular position of the display on the screen.

Light pens are typically operable only when pressed against the face of the video screen so that light is received by the light pen from a very small portion of the screen. If the light pen is withdrawn from the screen, the intensity of light received by the light pen photodetector as the electron beam passes is reduced, the detector receives light impulses from several of the horizontal raster lines of the electron beam as it covers the field of the screen, and external ambient light sources, particularly light reflected off the glass face of the screen, will interfere with the detection of the image on the screen. The necessity of placing the light pen in physical contact with the screen presents no limitation for conventional light pen applications such as computer aided drawing, but it does prevent the use of a light pen when the user either cannot or should not physically touch the screen, or where it would be of advantage for the user not to be near the screen.

In particular, physically disabled people may not have the ability to use a conventional light pen to communicate with a computer. Many individuals have lost the use of their arms or hands because of accidents or illness. They are unable to write with pen and pencil, or to stroke the keys of a standard keyboard, and may similarly be incapable of using a light pen in the standard fashion to input data to a computer through a CRT screen. Because persons so disabled lack the ability to operate such standard tools of communication as computer or typewriter keyboards, many educational and vocational opportunities are foreclosed or at least extremely limited.

A number of specialized devices have been developed to aid the communication abilities of severely disabled individuals. Many of the severely disabled retain the ability to control head position and direct head pointing can thus be used as a data input technique. Devices which utilize head pointing as a data selection technique generally include a display unit and a pointer which is attached to the head. The display unit typically contains the alphabet and numeric digits, and may also include commonly used words or phrases. In one type of device in use today, a light emitting diode (LED) is mounted next to each vocabulary element on the display unit and each LED is turned on and off sequentially. A photodetector mounted to the user's head has a field of view substantially limited to the area occupied by a single LED. When the photodetector points toward the selection display, it detects the light emitted from one of the LEDs. The scanning is stopped and the LED detected remains lighted until the user points to a different position. If the user dwells at a position for a predetermined period of time, the vocabulary entry associated with the LED detected is selected and displayed or printed.

There are several problems with the LED head pointing system discussed above. A particular problem is the lack of continuous head position feedback, since the discrete LEDs only show the approximate area being pointed to on the selection display. The user may not know whether he is pointing directly at the LED or at an area just close enough to the LED to detect it. If the latter, the user can easily drift away from the desired position before the time required to cause selection of a vocabulary item has elapsed. In addition, the display itself is fixed in size, number of vocabulary items, and the labeling of the vocabulary items, preventing their adjustment by a user to suit individual needs. Because these displays are so specialized, and of little use outside the field of aids for the disabled, their cost is relatively high since the production and development costs must be spread over a relatively low production volume.

Devices employing other head pointing techniques have also been used. The simplest device may be a pointing rod or stick attached to the user's head which can be used to directly punch keys on a keyboard. Such a technique has obvious limitations, such as the speed with which the pointer can be moved, the awkwardness of manipulating the stick, the necessity for modifications to standard keyboards to allow shifting and control, and fatigue of the wearer because of the weight of the rod or stick. Light beam head pointer systems have also been developed which use a small flashlight, mounted to the user's head, which projects a narrow beam of light onto a communication board capable of detecting the spot of light. For example, a photoconductive array, with a photoconductor associated with each key on a keyboard, can be used in conjunction with the light beam pointer. Such photoconductive arrays have the disadvantage of being relatively expensive because of the custom, low volume nature of the keyboard and the complexity of the electronics required to decode the character or word pointed to by the individual. Problems are also encountered because of ambient light which may saturate the photodetectors, thereby preventing the user's light source from being detected or resulting in spurious detections.

SUMMARY OF THE INVENTION

The present invention allows the user to locate a spot on the face of a video screen without having to physically touch the screen as must be done with conventional light pen systems. The invention utilizes a long range optical pointer which optically detects the video image on the screen and focuses the portion of the image at which the pointer is directed. The focused light from the video screen is converted by the pointer to a series of pulses corresponding to the portions of the group of raster lines in each frame that are detected in the pointer. The information in the pulse signals from the optical pointer is compared in processing circuitry to the video horizontal and vertical deflection signals to determine the horizontal and vertical position of the portion of the video screen seen by the optical detector averaged over a plurality of the detected raster lines.

The vertical and horizontal position output data from the processing circuitry can be used by a computer to provide a bright (or dark, if the background is bright) cursor spot on the video screen at the indicated vertical and horizontal position coordinates. The user can move this cursor spot about the screen at will by manipulating the pointer and can use the position of the cursor on the screen to communicate with the computer in a conventional manner as is done with a mouse or standard light pen. Because the optical pointer can be held by a user at a substantial distance from the video screen (e.g., 3 to 4 feet), the user can move the cursor spot around the screen much more rapidly and easily than can be done with a light pen or mouse since smaller hand movements are required. Moreover, the optical pointer is particularly adapted to be worn by handicapped individuals whose movements are limited to head pointing. Similar use may be made of the pointer by a non-handicapped individual, allowing the user to communicate with the video screen by head pointing while leaving the user's hands free to operate a conventional keyboard.

The optical pointer itself includes a photodetector responsive to light, a lens for focusing a portion of the image of the plurality of raster lines from the screen onto the photodetector when the optical pointer is at a selected distance from the screen, and a detection means responsive to the photodetector which provides an output signal pulse corresponding to the light from a raster line falling on the photodetector. Precise focusing of the raster pattern on the photodetector is not required, however, and the output signal from the pointer can be used to determine accurate vertical and horizontal coordinates at pointer positions substantially closer to or farther from the screen than the focused distance. The signal processing means is responsive to the output signal from the optical pointer and to the vertical and horizontal video deflection signals to determine the averaged vertical and horizontal position of the detected raster lines. The signal processing circuitry preferably ignores pulse signals from the optical pointer which follow the first pulse from any raster line focused on the photodetector or which precede or are followed by a gap in the raster pattern in which no line is detected. By being thus insensitive to the random gaps and multiple pulses found in the detection of the raster lines, the signal from the processing circuit allows a more stable and accurate averaged position to be determined.

In a preferred means for determining the horizontal position of the detected raster lines, the processing circuitry generates a timing pulse at the beginning of the detected raster line pulse which is terminated at the horizontal synchronization pulse. A sequence of short duration count pulses are then generated, proportional in number to the duration of the timing pulse, and the short count pulses are counted in a counter. A microprocessor controls the input of the detected raster line pulses so that valid raster line detections are passed while initial and final groups of raster lines particularly likely to precede or follow gaps in raster line detections are blocked. The counter provides a running total of the counted pulses for all of the detected raster lines which are passed. After the group of raster line pulses is completely counted, the total (or a multiple of the total, to improve resolution) is divided by the number of counted raster lines to yield an average horizontal position for the initial point of detection of the raster lines.

The microcontroller also counts the number of horizontal synchronization pulses from the time of the vertical synchronization pulse at the initiation of a frame to each of the detected raster line pulses. The microcontroller then determines the averaged vertical position as the sum of the positions of the first and last raster lines which were used in determining horizontal position (lines integrated). The accuracy of the detected vertical position is preferably further enhanced by adding the number of raster lines detected but not integrated which follow the last integrated raster line and by subtracting the number of raster lines detected but not integrated which precede the first integrated raster line.

Further objects, features and advantages will be apparent from the following detailed description when taken in conjunction with the accompanying drawings showing a preferred embodiment of the invention.

BEST MODE FOR CARRYING OUT THE INVENTION

Figure 1:
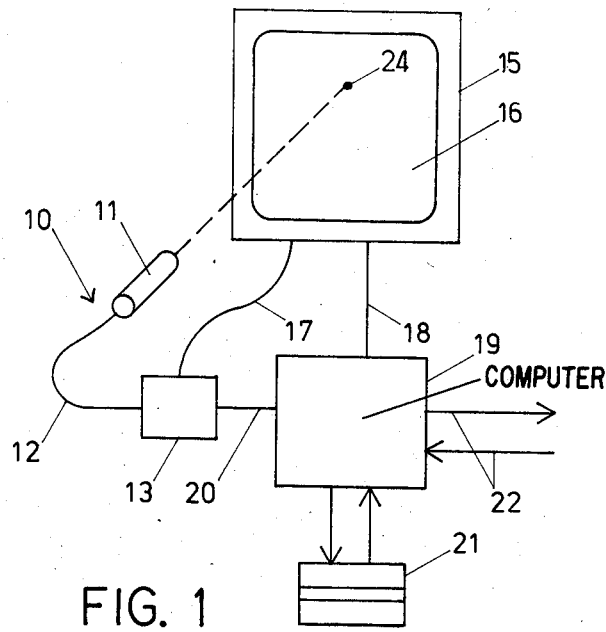
FIG. 1 is a schematic view of the major components of long range optical pointing apparatus used to provide communication with a computer through a CRT video screen.

With reference to the drawings, a long range optical pointing apparatus in accordance with the invention is shown generally at 10 in FIG. 1. The apparatus 10 includes an optical pointer unit 11 connected by a signal line 12 to a signal processing unit 13. The apparatus 10 communicates with a video display terminal 15 which includes a cathode ray tube (CRT) screen 16 upon which visual images are produced in the usual manner by scanning an electron beam in a raster across the face of the tube. The video signal which controls the scanning of the screen 16 is provided on a line 17 to the processing unit 13, and the display terminal 15 is controlled through a line 18 by a computer 19, which also communicates with the processing unit 13 over an input line 20. The computer 19, which may be a typical mini- or microcomputer, can also be connected to peripheral equipment such as a disc drive 21 and may communicate on input-output lines 22 to other devices such as another computer, a printer, a modem, etc.

As in conventional display systems, the video display terminal 15 is controlled so that the electron beam traces out a raster of generally horizontal lines on the screen 16. The screen is completely scanned from top to bottom in a fraction of a second, so that several complete scans or frames are completed each second. In the present invention, for the reasons explained further below, it is preferred that the electron beam be adjusted with the brightness and contrast controls to provide a low light intensity background covering the entire screen, although higher intensity images may be formed on the screen. However, it is also possible, if desired, to scan periodically until a detection is made. The optical pointer unit 11, which may be located several feet away from the screen, when pointed at the screen will detect the light emanating from a portion of the screen generally centered at the dot illustratively labeled 24 in FIG. 1. The optical pointer 11 converts the raster lines of light that pass through its field of view into electrical pulses on the line 12 which are supplied to the processing unit 13. The processor 13 compares the pulses from the optical pointer unit 11 with the vertical and horizontal position signals provided from the video display terminal 15 on the line 17 and provides an output data signal on the line 20 indicating a point position on the screen lying within the field of view of the optical pointer. The computer 19, which may be a small, general purpose microcomputer, can be programmed to control the pattern of images placed on the screen 16 so that a bright spot or cursor will appear at the position coordinates supplied by the processor 13. As the pointer 11 is moved, the bright spot 24 will move about the screen, thereby providing feedback to the user of the position at which the pointer 11 is directed.

It is apparent that with this information available to the user, a variety of application programs can be employed to allow communication between the user and the computer. For example, the computer 19 may be programmed to display the image of a standard keyboard onto the screen 16. The user may then move the pointer 11 until the spot 24 (which may be brighter in the darker areas of the screen and darker in the brighter areas, for maximum contrast) reaches the position of a number or letter key which the user wishes to designate. The user may then inform the computer that the particular key is to be designated. Where the pointer 11 is mounted to the head of an otherwise manually disabled user, the signal indicating that a particular key is to be designated can be sent to the computer by a switch activated by closing of the individual's jaws, by limb movement, if possible, or by simply causing the spot 24 to dwell at a location for a predetermined period of time. Because the position of the spot 24 can be controlled by the pointer 11 from a position remote from the screen 16, the user can sit at a normal distance away from the screen (e.g., 3 feet) and can move the spot 24 around the screen quickly and easily with relatively small head movements.

Figure 2:
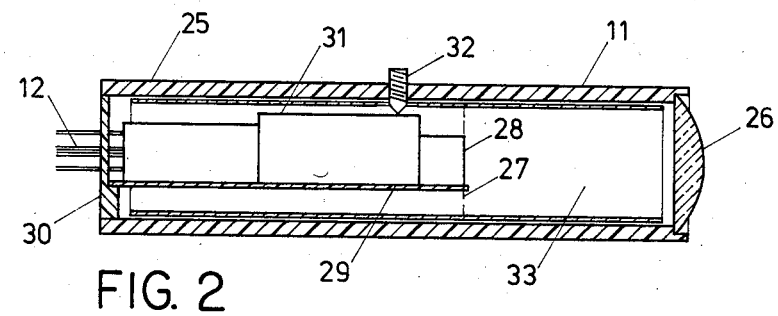
FIG. 2 is a cross-sectional view of the optical pointer unit.

With reference to the cross-sectional view of FIG. 2, the optical pointer 11 includes a hollow cylindrical case 25 with a convex lens 26 mounted at one end. The lens 26 is selected to focus the light emanating from the screen at a selected distance (e.g., 3 feet) onto a focal plane, the position of which is illustratively indicated by the dashed line labeled 27 in FIG. 2. A photodetector 28 is mounted within the pointer 11 such that the active portion of the photodetector lies in the focal plane 27 and will have the light from a portion of the screen 16 focused upon it. It is quite apparent that more elaborate and complex lens systems may be utilized, if desired, to provide a greater focusing range, adjustability of focus and so forth. However, a simple lens system is generally adequate where the optical pointer will be located within a convenient range of distances from the screen, as where the pointer is to be mounted to the head of a user sitting at a video display terminal. The optical pointer is relatively insensitive to focus; for example, if the pointer 11 is focused at three feet from the screen, accurate and consistent position coordinate information will generally be provided when the pointer is within the range of one foot to four feet from the screen. The photodetector 28 is mounted on a support member 29 which rests with its edges in engagement with the cylindrical inner wall of the case 25 and is attached at one end to a back plate 30. A rigid block 31, which may enclose the electronic components which operate on the signal provided from the photodetector 28, is also mounted on the support member 29. A set screw 32 is threaded through the outer support case 25 into contact with the block 31. When the set screw 32 is out of contact with the block 31, the support member 29 and the elements mounted to it can be moved back and forth within the case 25 until the photodetector 28 lies in the focal plane 27 at a selected distance from the screen. The set screw 32 is then turned into contact with the block 31 to hold the photodetector at this position. Generally, the pointer can be focused by observing the amplified pulses from the photodetector when the pointer is directed at the CRT screen and adjusting the position of the photodetector to maximize the magnitude of the pulses. To reduce the effect of electromagnetic interference, a grounded copper or brass conductive shielding tube 33 is inserted inside the case 25 and surrounds the photodetector 28 and the electronics within the case 31. The electrical pulse signals from the photodetector, as processed through the electronics within the case 31, are provided to the output lines 12.

Figure 3:
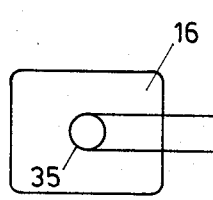
FIG. 3 is a diagram illustrating the manner in which a subfield of the screen is detected by the optical pointer.
Figure 4:
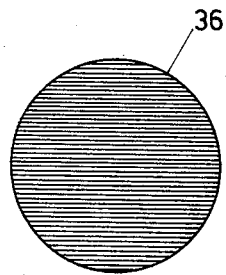
FIG. 4 is an illustrative view showing the focused raster lines detected by the optical pointer.

As illustrated in FIG. 3, a fairly large sub-field 35 of the screen 16 is focused by the lens 25 onto the photodetector 28. Assuming that the photodetector active area is substantially circular (which is not necessarily the case, as noted below), the image focused on the photodetector would be a series of bright lines traced across the active face 36 of the photodetector, as shown in FIG. 4. For example, the field seen by the photodetector may encompass thirty or more lines of a 262 line frame. The number of raster lines seen by the photodetector is a function of the focal length of the lens, the size of the active area of the photodetector, the dimensions of the video screen, and the distance of the lens from the screen. For a 20 mm diameter lens, which is a size allowing the optical pointer to be conveniently small and compact, the number of raster lines seen can be determined from the following equation:

$$N = 2 \cdot r \cdot (s/f - 1) \cdot L/V$$

where f is the focal length of the lens, s is the distance between the video screen and the lens, r is the radius of the active area of the photodetector, L is the number of lines in the video screen (e.g., 262), and V is the vertical size of the television screen. For example, for a photodetector having an approximately circular active area with a radius of 0.631 mm, a video screen with a vertical height of 7.2 inches or 182.9 mm, a distance of approximately 1 meter from the screen to the lens (1000 mm), and a focal length of 50 mm, approximately 34 of the 262 raster lines would be focused on the photodetector active area. In effect, an optical pointer 11 with these dimensions at a distance of one meter from the screen "sees" an area or sub-field of the screen 16 approximately one inch in diameter. As indicated below, the apparatus of the invention determines an averaged position of the area seen by the optical pointer and provides a signal indicative of the average vertical and horizontal position on the output line 20.

Figure 5:
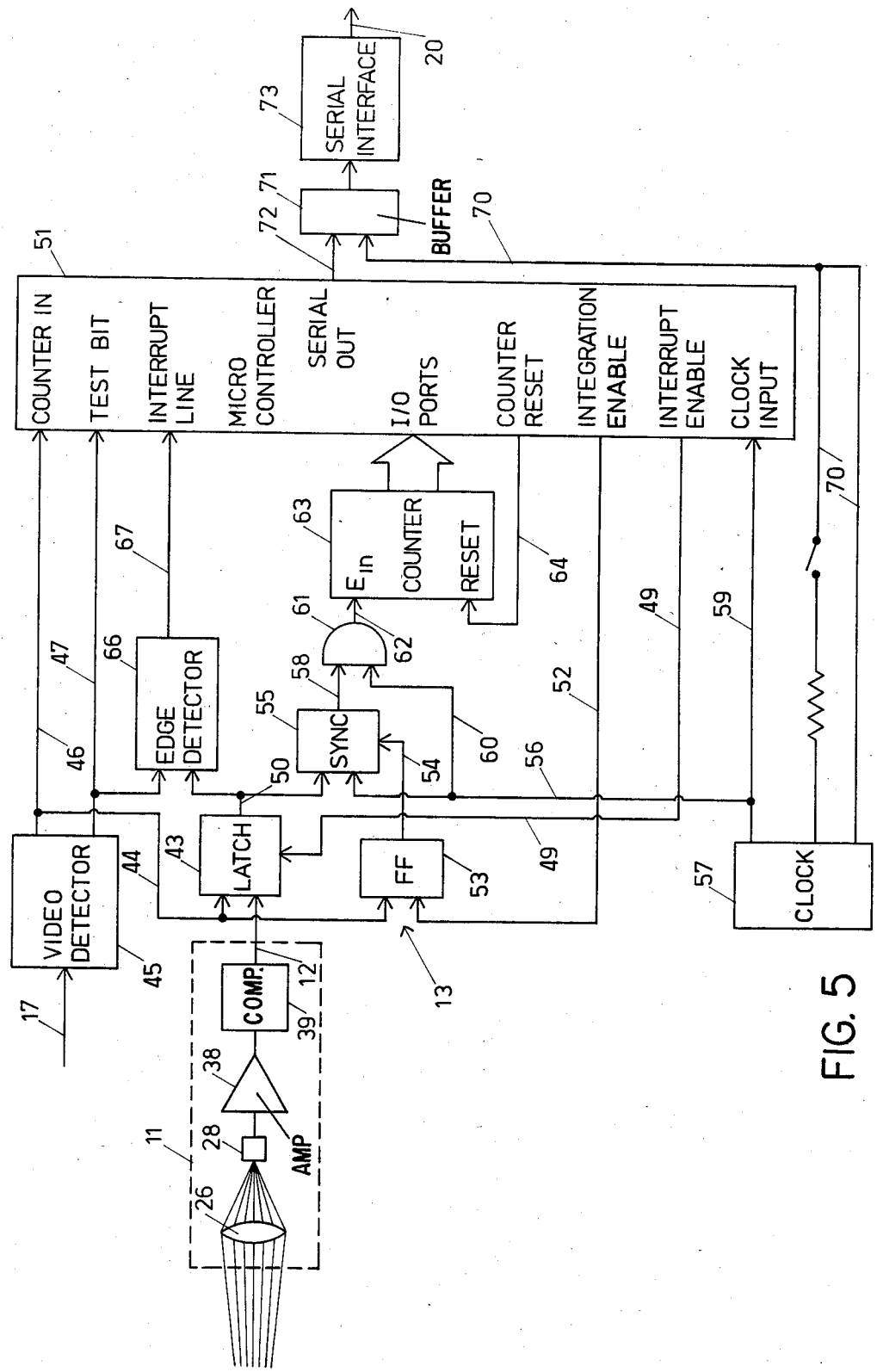
FIG. 5 is a block diagram of the major functional components of the apparatus of the invention.
Figure 6:
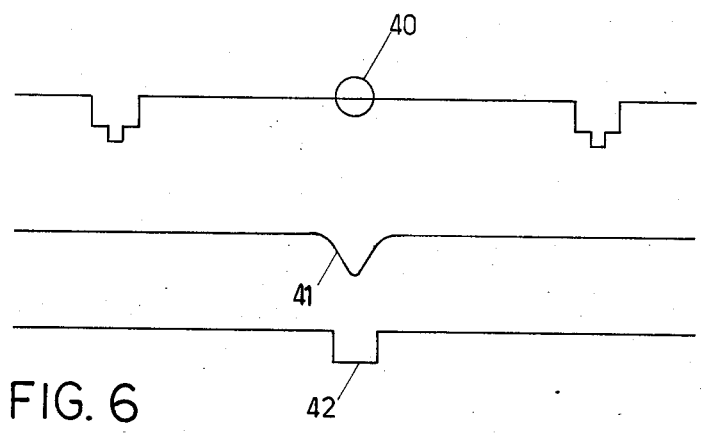
FIG. 6 is a diagram illustrating the traces of a video signal compared with the amplifier and comparator outputs of the electronic circuit within the optical pointer unit.

A schematic block diagram of the signal processing components within the optical pointer 11 and the processor 3 is shown in FIG. 5. The pulses produced by the photodetector 28 are amplified by an amplifier section 38 within the optical pointer unit 11, the output of which is supplied to a comparator 39 which compares the magnitude of the output signal from the amplifier to a selected level and provides a pulse signal on the line 12 of chosen amplitude as long as the magnitude of the amplifier output is above the threshold level. With reference to FIG. 6, only a small segment 40 of a video signal is detected by the optical pointer. The variable magnitude output pulse 41 from the amplifier 38 is converted to a square wave pulse 42 by the comparator 39.

The pulse signals on the line 12 from the comparator are supplied to a latch flip-flop 43 within the signal processing unit 13. The latch 43 also receives the horizontal synchronization signal on a line 44 from a video detector 45. The video detector 45 receives the video signal on the line 17 from the video display terminal and provides the horizontal synchronization pulses on an output line 46, connected to the line 44, and the vertical synchronization pulses on a line 47. The latch flip-flop 43 also receives an interrupt enable signal on a line 49. The latch flip-flop 43 is structured to operate such that a horizontal position timing pulse is provided by the latch on an output line 50—if the interrupt enable signal is present on the line 49—which begins at the leading edge of the optical pointer output pulse on the line 12 and ends at the beginning of the horizontal synchronization pulse on the line 44.

The interrupt enable signal on the line 49 is provided from a microcontroller 51 to control the processing circuitry so that data is passed from the optical pointer 11 through the latch 43 only when the microcontroller is ready to receive and process such data. The microcontroller 51 also provides an integration enable signal on a line 52 to a flip-flop 53 which has as its other input the horizontal synchronization signal from the line 44. A "high" output signal is provided from the flip-flop 53 on an output line 54 when the integration enable signal on the line 52 is present. The output of the flip-flop 53 is reset by the horizontal synchronization signal and can only change state when the horizontal synchronization signal on the line 44 is not present. The pulse on the line 50 prevailing between the beginning of the optical pointer detection pulse and the beginning of the horizontal synchronization pulse is applied to a synchronization circuit 55 which also receives the output of the flip-flop 53 on a line 54 and clock pulses on a line 56 from a clock generator 57. The synchronization circuit 55 adjusts each pulse on the line 50 so that the output signal on a line 58 from the circuit 55 is a pulse beginning and ending in synchrony with clock pulses on the line 56. The clock pulses and horizontal position pulses are synchronized to eliminate any transient pulses which might otherwise occur. The high frequency (e.g., 9.8304 MHz) clock pulses are also provided on an output line 59 to the clock input of the microcontroller 51 and on a branch line 60 to an AND gate 61. The other input of the AND gate is the synchronized pulse on the line 58, so that the output line 62 from the AND gate 61 contains count pulses at the clock rate which persist as long as the horizontal position timing pulse on the line 58 is present. These count pulses are supplied to a counter 63 which provides a parallel multi-bit output signal to the parallel input/output ports of the microcontroller 51. The counter 63 is cleared and reset by a reset signal on a line 64 from the microcontroller 51.

The horizontal synchronization signal on the line 46 is also provided to a counter input of the microcontroller 51, and the vertical synchronization signal on the line 47 is provided to a test bit input and the interrupt line of the microcontroller. The microcontroller may incorporate a counter unit capable of counting the horizontal synchronization pulses in a selected period of time, and the vertical position of the raster lines detected by the optical pointer may be calculated in proportion to the number of horizontal synchronization signal pulses counted between the vertical synchronization signal pulse and the detection of each raster line, which is effectively proportional to the time between the vertical synchronization pulse and each raster line. The vertical synchronization signal on the line 47 and the output of the latch flip-flop 43 on the line 50 are also provided to an edge detector 66 which provides an output pulse on a line 67 to an interrupt port of the microcontroller when both the vertical synchronization pulse and the timing pulse on the line 50 are not present. During this time, the interrupt routine can be initiated to obtain data from the optical pointer.

The clock pulse generator 57 provides timing pulses at other frequencies on output lines 70 leading to a buffer circuit 71 which also receives the serial output data on a line 72 from the microcontroller 51. The serial data on the line 72 is indicative of an averaged vertical and horizontal position of the area of the screen at which the optical pointer is directed. This serial information is transmitted at the desired transmittal rate, as determined by the frequencies on the line 70, through a serial interface unit 73 to other components of the system on the line 20, such as the general purpose computer 19.

Figure 7:
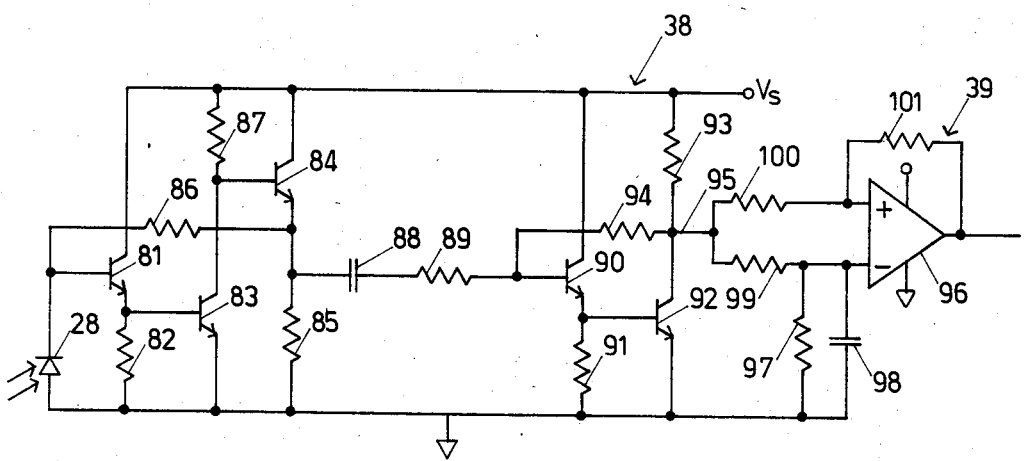
FIG. 7 is an electrical schematic of the amplifier and comparator contained in the optical pointer unit.

The photodetector 28 is preferably a photodiode, as shown in FIG. 7, although a phototransistor may be use by shorting the base and emitter leads together. In the latter case, the collector would act as the cathode and the shorted leads act as the effective anode of a photodiode. The intensity of the light emitted from the portion of the raster line traced over the active area of the photodiode and the length of time the line is on the active area determine the effective detection of the raster line by the photodiode. Raster lines which are very bright can cause current to flow through the photodiode 27 soon after the light from the line first impinges upon the active area. In contrast, a dull raster line may not initiate current flow through the photodiode at all, or may do so only after the raster line has been traced partially across the photodiode active area. As a result, variations in the raster line detection pattern can occur in each group of detected raster lines. For example, bright lines near the top and bottom of the active area which are followed or preceeded by dull lines can produce pulse patterns in which lines detected are followed by one or more lines which are not detected. The photodiode may not detect the duller lines until the light from the line has moved well across the active area of the diode and has impinged on the diode a sufficient time to produce detection. Thus, there may not only be gaps in the pulse pattern between lines detected, but the time at which a pulse is produced by the photodetector may vary from line to line even though the light from successive raster lines may first impinge upon the active area at the same relative time.

Figure 8:
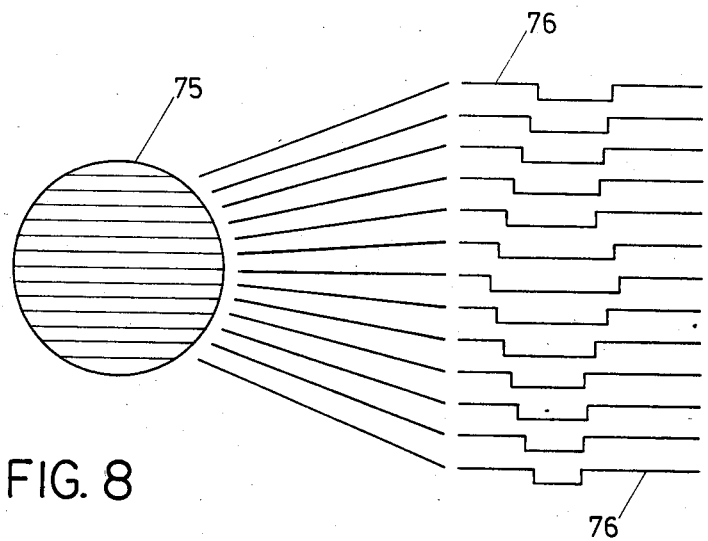
FIG. 8 is an illustration of an idealized pattern of pulses produced by the optical pointer unit as raster lines are scanned across it.
Figure 9:
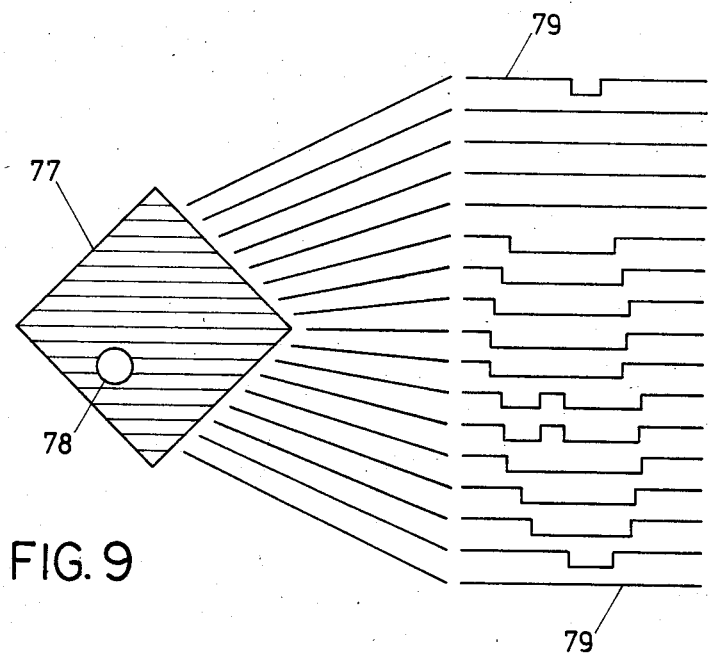
FIG. 9 is a more realistic and typical optical pointer output pulse pattern.

An ideal pulse pattern from the comparator 39 for a perfectly circular active photodetector area 75 would have the form of the pulse waves indicated at 76 in FIG. 8. However, such ideal pulse patterns are not observed. In addition to the variations caused by brighter and duller trace lines, the active area of practical photodetectors, such as phototransistors and diodes, is generally not circular. The shape is typically square with a bonding pad masking a portion of the active area, as illustrated in the square area 77 in FIG. 9 with a bonding pad 78. The pulse pattern produced by such a photodetector active area is illustrated by the graph lines labeled 79 in FIG. 9. The irregular shape of the active area 77 not only causes non-symmetrical pulse patterns, but the pulse patterns from one frame to another can change if the optical pointer 11 is rotated about its axis. The presence of the bonding pad can cause two variations in the output pulses: the delay of a single pulse until the raster line has traveled across the pad, or the possible generation of a double pulse—one pulse resulting from light detection in front of the pad and the second pulse resulting from detection after the pad. The double pulses will be ignored by the processing circuit 13 since the first pulse from the pointer will initiate a timing pulse on the line 50 which will persist until the horizontal synchronization pulse is received. As explained further below, the effect of skipped pulse lines and delayed pulses is minimized by signal processing in processing unit 13 to provide a stable estimate of an averaged position of the raster lines traced across the photodetector.

With reference to FIG. 7, the amplifier section 38 within the optical pointer unit receives an input signal as the current through the photodetector 28 changes with the intensity of incident light. The amplifier shown has two stages, a first providing high gain, low input impedance transresistance amplification, and the second providing voltage amplification. The low impedance and high gain of the first stage is needed to provide minimum rise time and maximum bandwidth for the photodetector input signal. The high frequency cut-off is determined by the combination of the capacitance of the photodiode 28 and the input impedance of the amplifier. The photodiode is connected to the base of a first, common collector transistor 81 which provides a voltage output across an emitter resistor 82 to the base of a second transistor 83 in a common emitter configuration. The voltage at the collector of the second transistor 83 is provided to the base of an output transistor 84 biased in a common collector configuration, with the output voltage across an emitter resistor 85 being fed back through a resistor 86 to the base of the first transistor 81. The first two transistors 81 and 83 provide current gain, with the collector load resistor 87 of the second transistor 83 providing conversion of the amplified current to a corresponding voltage. The third transistor 84 acts as an emitter follower for reducing the output impedance of the amplifier. The overall gain of the first stage is controlled by the feedback resistor 86, which also reduces the input and output impedance.

The voltage across the emitter resistor 85 is applied through a high pass filter—comprised of a series connected capacitor 88 and resistor 89—to the base of a first transistor 90 within the second section of the amplifier 38. The voltage across an emitter resistor 91 is provided to the base of a second transistor 92, connected in a common emitter configuration, having a collector resistor 93 and a resistor 94 feeding the collector voltage back to the base of the first transistor 90. The second stage of the amplifier, comprised of the transistors 90 and 92, preferably amplifies the output voltage of the first stage by about 10 and, with the capacitor 88 and resistor 89, highpass filters the signal from the first stage. The filter eliminates DC and low frequency signals which may saturate or otherwise interfere with the signals indicative of pulses from the raster lines incident on the photodetector. Examples of such low frequency spurious signals include sunlight reflecting off of the video display screen and 60 Hertz light pulsations from fluorescent lights. Ten kilohertz has been found to be a satisfactory cut-off frequency for the single pole high pass filter.

The comparator 39 compares the output signal from the amplifier 38 on a line 95 to a low pass filtered and attenuated version of the signal. The low pass filtered signal provides a reference which varies as a function of the ambient signal magnitude. The reference input to the difference amplifier 96 of the comparator is provided across a voltage divider composed of a paralleled resistor 97 and capacitor 98 and an input resistor 99. The unfiltered signal is provided to the positive input of the amplifier 96 through a series resistor 100, with a feedback resistor 101 extending from the output to the positive input of the amplifier. The level at which the comparator changes state is determined by the DC output level of the second stage of the amplifier and the series combination of attenuation resistors 99 and 97. The level is set such that the comparator will not be triggered to change state by normal noise voltage levels. Preferably, the low pass filter, composed of the resistors 97 and 99 and the capacitor 98, averages the input voltage over many raster lines (e.g., 17) to provide a stable reference voltage. A small amount of hysteresis may be added to the comparator to reduce the potential for oscillation during the time that the raster detection is decaying. Such oscillation might occur because of the slow delay of the signal due to the residual brightness of the phosphor of the video terminal screen.

As noted above, a grounded conductive brass shield 33 is provided inside the tube of the optical pointer unit 11. The conductive shielding minimizes high frequency EMI noise which could be picked up and amplified by the high gain amplification in the amplifier section 38. The dominant EMI noise signal is the horizontal synchronization signal of the video terminal, typically having a period of 63.3 microseconds, which can cause spurious signals resembling photodetections. The trip level of the comparator can be increased to compensate for the noise, but this necessitates increasing the gray scale background brightness of the raster lines on the video terminal. The shielding material 33 minimizes this problem.

The signal processing section 13 performs three functions: optical pointer signal averaging, position calculation, and serial output of the calculated position data. The signal averaging utilized in calculating position is needed to provide the stability and resolution of position detection despite the random properties of the signal produced by the optical pointer when it operates at a substantial distance from the video screen. The serial output allows standard communication between the signal processing unit and the auxiliary computer 19.

The microcontroller 51 (e.g., an Intel HMOS 8748H) is programmed to provide the calculation of the average location at which the optical pointer is directed such that the random variations of the brightness of the raster line, and the shape of the active area of the photodetector, do not introduce unacceptable position calculation errors or a lack of stability in the position data.

To minimize the effects of the variations in the relative position of the leading edge of pulses from raster line detections, and gaps in the pulse pattern, two signal processing procedures are used: the skipping of raster line pulses at the beginning and end of a frame of detections and the averaging of the positions of the pulses from the optical pointer. By skipping the optical pointer pulses at the beginning and end of a pulse pattern, where gaps in the pattern are most likely, the effects of the gaps on the average detections will be minimized. The variations in the position of the leading edges of the lines detected at the beginning and end of the pulse pattern is also greater due to the shape of the active area of the photodetector, and by skipping these first and last lines, this source of error is also eliminated. The averaging of the middle raster line pulses in a frame of detections filters out the variation in the position of the leading edges to provide an estimate of the horizontal position at which the pointer is directed which will be stable from frame to frame. Because the number of raster lines which will be detected by the optical pointer, and therefore the number of pulses that will be produced for each frame, will vary, it is not feasible to skip a fixed number of pulses at the beginning and end of a frame. For example, fewer raster lines will be detected as the optical pointer is moved closer to the screen, whereas more lines will be detected as the pointer is moved away. The intensity of the image on the screen may also vary from time to time, affecting the number of raster line pulses detected. Therefore, the number of raster line pulses to be skipped and the number to be integrated are determined from calculations based on the total number of raster line pulses that were detected in the preceding video frame. Generally, it has been found appropriate to skip a sixth of the raster line pulses at the beginning and at the end of the pulse pattern, with the middle two-thirds of the pulses being averaged together. The averaging of the lines improves the accuracy of the detected position information by approximately the square root of the number of lines averaged.

The vertical position is preferably determined by adding the vertical position number of the first line averaged for horizontal position detection and the last line so averaged, adding the number of raster lines detected after the last averaged line and substracting the number of raster lines detected before the first averaged line. The resulting vertical position number can range from zero to twice the total number of lines in the video frame, or from zero to approximately 500. This provides a resolution down to a half pixel since vertical position numbers can be calculated which will be odd numbers, and therefore between raster lines.

As described above, the horizontal position determined by the optical pointer is based on the average position of the leading edges of the pulses detected by the optical pointer. The horizontal position of the initial detection of a raster line is proportional to the length of time between the initiation of the timing pulse and the termination of the pulse at the beginning of horizonal retrace, which in turn is proportional to the number of clock pulses counted by the counter 63. The total in the counter at the end of a frame is proportional to the average position of all of the lines. The average may be computed by dividing the total number in the counter 63 by the total number of raster lines which were averaged. The quotient has an integer and a fractional part. The fractional part of the quotient contains some positional information but is difficult to handle in the internal processing of the microcontroller. To obtain as much of this position information as possible without having to handle fractional portions of the quotient, the total number of counts from the counter is preferably multiplied by four before the division so that the integer portion of the quotient contains substantially all of the useful horizontal position information, allowing the remaining fractional portion to be discarded. The range of possible values for a vertical position using a 9.8304 MHz clock pulse rate is about 0 to 2,100.

The vertical and horizontal positions are calculated for each frame in which detections are averaged. If no detections are made or averaged in a frame, a special code message is put out at the beginning of vertical retrace to indicate this condition to the computer 19, generally meaning that the pointer 11 is not directed at the screen 16.

Preferably, one half raster line of hysteresis is included in the calculation of the vertical position. Thus, the vertical position must change by two units (two halves of a raster line) before the vertical position data provided on the output line 20 will change. For example, if the number 129 was provided as the position datum for a particular video frame, and the calculated position for the next video frame was 128 or 130, then the output for that frame would remain at 129. If the calculated vertical position for the next frame was less than 128 or greater than 130, then the position output datum for that frame would be the number calculated because there would be more than one unit of difference between the two vertical position numbers. The horizontal position preferably has one-half clock cycle of hysteresis added. The horizontal hysteresis is provided in the same manner as described above for the vertical hysteresis with the exception that the horizontal position preferably must change by at least three units (three-fourths of one period of a 9.8304 MHz clock pulse signal) before the output horizontal position datum will change. The hysteresis is added to increase the stability of the output signal since it is to be expected that the position at which the pointer 11 is directed on the screen by the user will vary somewhat even though the user is trying to maintain it at a specific location. The added hysteresis also makes the system less sensitive to variations in the relative positions of the raster lines on the screen which commonly vary somewhat in typical video display systems.

The horizontal position is calculated from the total in the counter 63 for all of the averaged lines. Because the position calculated is measured from the optical pointer detections to the beginning of horizontal synchronization, the largest position numbers are at the left edge of the screen and the smallest on the right. This horizontal position number is opposite to that generally used with most graphic displays for computers. The count is also not scaled to any particular graphics display. The right edge referenced horizontal position produced on the serial output line requires a conversion in the receiving computer. This conversion may be accomplished in accordance with the following formula:

$$HP = \frac{NP \cdot FL}{PL} \cdot \left(1 - \frac{C}{3.93216 \times 10^7 \, FL}\right)$$

wherein HP is the horizontal position on the graphics of the computer, NP is the number of pixels in the graphics display of the computer, C is the count received from the serial interface 73 of the signal processing unit, FL is the time between the end and the beginning of horizontal synchronization (approximately 59 microseconds), and PL is the time between the first and last pixel of the graphics display.

If the monitor does not display the entire raster line, the counts from the optical pointer will not extend between the minimum and maximum count numbers. To correct for this condition, the horizontal position (HP) can be referenced to the middle of the graphics display. The following calculation produces the horizontal position on the graphics display (HPGD):

$$HPGD = HP - \frac{0.5 \cdot NP}{\frac{FL}{PL} - 1}$$

Figure 10:
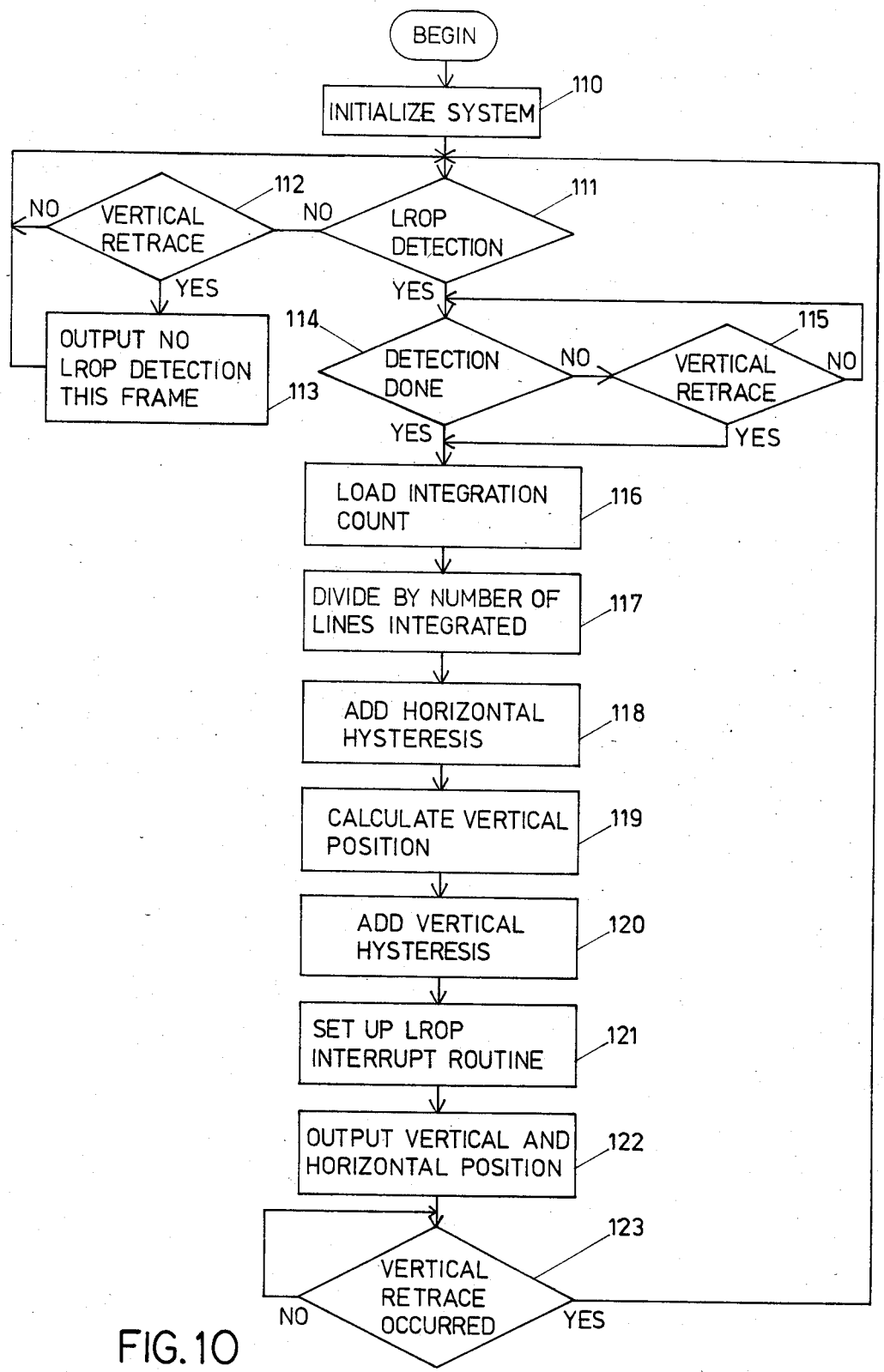
FIG. 10 is a flow chart illustrating a program for calculating the horizontal and vertical positions of a portion of the screen detected by the optical pointer.
Figure 11:
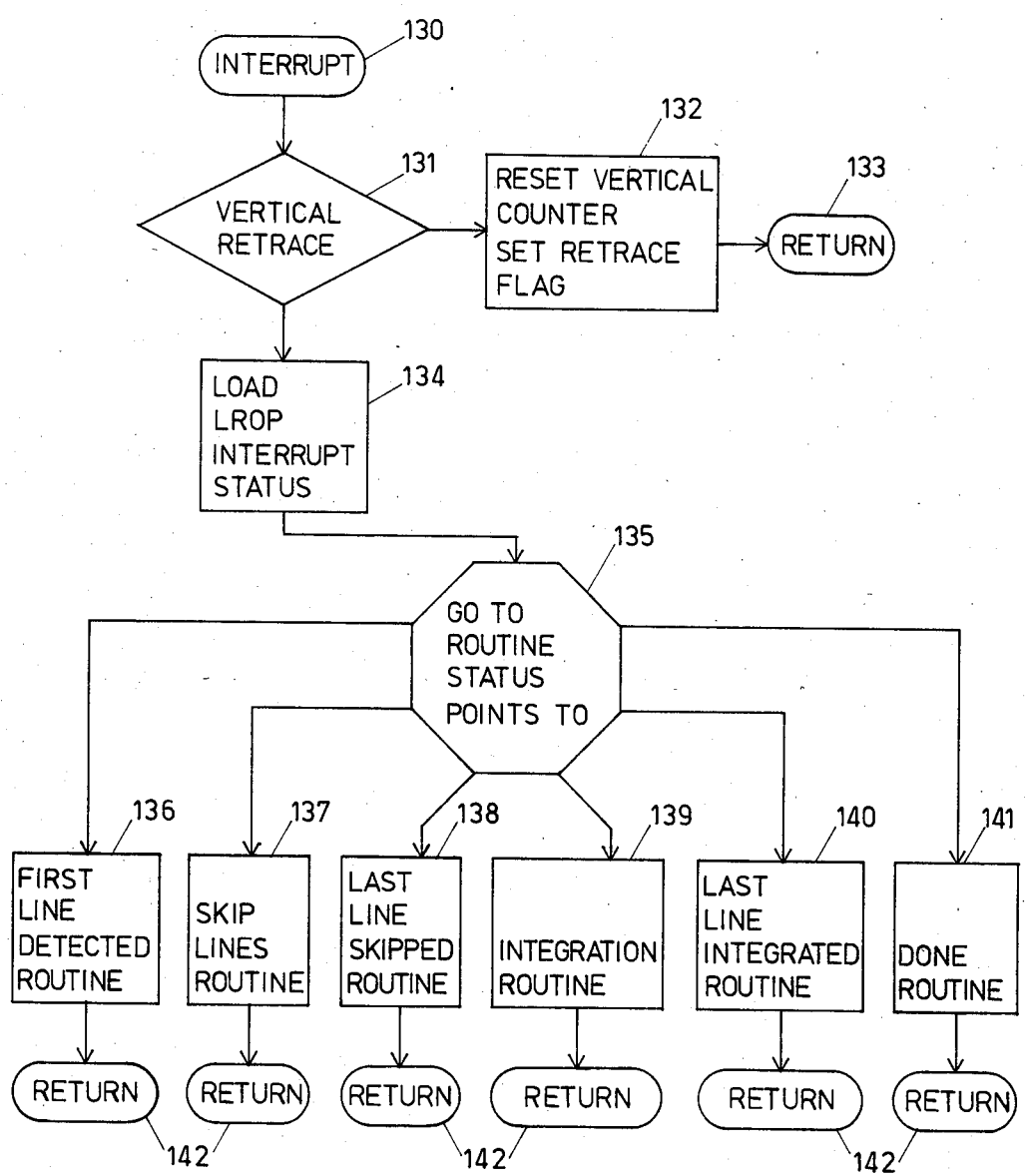
FIG. 11 is a flow chart further illustrating portions of the program of FIG. 10 which are selected during interrupts.

A flow chart showing the major processing steps of the program for receiving and processing the data in the microcontroller 51 is shown in FIGS. 10 and 11, and an illustrative program for carrying out these steps in an Intel HMOS 8748H microcontroller is set out in the microfiche appendix. With respect to FIG. 10, the microcontroller program begins with initialization of the system at block 110 and proceeds at block 111 to determine whether a raster line has been detected by the optical pointer. If not, the program then determines, at block 2, whether vertical retrace has occured; if not, the program loops until an optical pointer detection occurs or, if vertical retrace occurs without any optical pointer detection occuring, an output signal is provided indicating that there is no optical pointer detection during the frame of data (block 113), and the system returns to search for optical pointer detections. When a detection occurs, a determination is made whether the detection is done (block 114); if not, and if vertical retrace has not occured (block 115), the program loops until either the detection is finished or a vertical retrace occurs, at which time the integration count is loaded into memory (block 116). The integration count, multiplied times four, is then divided by the number of lines integrated (block 117), and a horizontal hysteresis figure (block 118) is added to the quotient to provide a number indicative of the best estimate of the horizontal position of the area detected by the optical pointer. The horizontal hysteresis number (positive or negative) is preferably added in this manner to minimize fast changes in horizontal position which may be due to noise or small movements of the optical pointer with respect to the screen, so that the spot which will be displayed upon the screen 16 to the user, as controlled by the computer 19, will remain stable. The vertical position is then calculated as discussed above (block 119) and vertical hysteresis is added to the vertical position number (block 120). The interrupt routine is then initialized (block 121), after which the vertical and horizontal positions are outputed to the serial interface 73 (block 122); the program thereafter waits until vertical retrace has occurred (block 123), and then returns to block 111 to await a detection of a signal from the optical pointer.

Interrupts are caused by each optical pointer detection and vertical retrace, and temporarily suspend the execution of the algorithm shown in FIG. 10.

The interrupt routine, as shown in FIG. 11, is entered at block 130 and determines first whether a vertical retrace has occurred; if so, the vertical counter is reset (block 132), and the retrace flag is set, and return to the main program occurs (block 133). If vertical retrace has not occurred, the interrupt status is loaded (block 134), and a decision is made to transfer to the appropriate subroutine depending on the status pointer (block 135). The subroutines include a routine for determining the first line detected (block 136), a routine to skip lines having gaps (block 137), a last line skipped routine (block 138) to determine the last line to be skipped, an integration routine (block 139) to determine when valid data is being received and to allow data input to the counter 63, a last line integrated routine (block 140) to determine the last line to be integrated before the integration enable signal is removed, thereby stopping any further counting of data in the counter 63, and a done routine (block 141) for collecting the number of detections after the last line integrated.

The interrupt routine performs all of the control functions for determining which optical pointer line detections are to be skipped and which are to be averaged, and for recording the necessary information to perform vertical and horizontal position calculations. The initial information required for control of the skipping and averaging of detections is the number of optical pointer detections to be skipped before averaging and the number of detections to average. This information is generated from the number of detections in the prior video frame.

The information required for horizontal and vertical position calculation includes the number of detections skipped before averaging, the vertical position number of the first raster line averaged, the vertical position number of the last raster line averaged, the number of lines averaged, and the number of optical pointer line detections after averaging.

Other information required is the vertical position number of the last line detected, which is compared to the number of the current line being drawn to determine if the optical detection pattern has been completed. The total number of pulses detected is also required since this number is needed to set up the skip and averaging routines for the next video frame. This number can be determined in the interrupt routine directly, or can be calculated by adding the total number of detections skipped before and after averaging and the number of detections averaged.

The interrupt routine includes at least the five states indicated in blocks 136–140 in FIG. 11. The interrupts must occur after the horizontal synchronization pulse at the end of the raster line detected. This condition insures that the raster line counter will not change its count during the interrupt routine, which could happen if the interrupts occurred at the beginning of a optical pointer detection pulse. To insure a stable state of the raster line counter, the interrupt does not occur until after the raster line counter is incremented. The counter will be stable for over 60 microseconds, which is more than enough time to complete the interrupt routine. Thus, the recorded number of the raster line is one more than the number of the line on which the actual detection occurred, which can be accounted for in the internal processing. Because the interrupts do not occur until the end of the raster line, there is a one raster line delay in enabling and disabling the integration counter. Thus it is necessary for the program to determine if a line was or was not integrated in the intervening delay of the integration control signal. For example, there could be a one line gap in the pulse pattern which could cause an error in the number of lines that were integrated if the gaps were not taken into account.

The skip lines routine 137 begins by storing the current line number in the last line detected register, decrementing the skip count and testing if it is zero. If the skip count is zero, then averaging is enabled and the program is incremented to the next interrupt state. In addition, the number of detections skipped is incremented and the number of lines detected is incremented.

The routine 138 for the last line skipped begins by obtaining the old last line number and storing the current line number in the last line detected register. A test is then made to see if the old last line number is one line less than the current line number; if the difference is greater than one, then the number of lines integrated is incremented. The number of the first line averaged is saved, the number of lines detected is incremented, and the program increments to the next interrupt state.

The integration or averaging routine 139 begins by storing the current line number in the last line detected register, storing the current line number in the last line integrated register, and decrementing the average count and testing for zero. If the average count is zero, then averaging is disabled and the program increments to the next interrupt state. The number of lines integrated and the number of lines detected are incremented.

The last line averaged or integrated routine 140 begins by saving the number of the first line after integration, getting the old last line, and storing the current line number in the last line detected register. A test is then made to see if the old last line number is one less than the current last line number; if the difference is one, then the number of lines integrated is incremented. The number of lines detected is then incremented and the program increments to the next interrupt state.

The done routine 141 stores the current line number in the last line detected register, increments the number of detections skipped after averaging and increments the number of lines detected.

The position processing algorithm contained within the program has three functions: setting up the optical pointer detection interrupt routine, determining the existence and the ending of an optical pointer detection pattern, and performing the vertical and horizontal position calculations. Setting up of the interrupt routine involves determining the number of detections to be skipped based on the number of optical pointer detections in the previous frame. This number is approximately one-sixth the number of optical pointer detections in the previous frame, and is preferably determined from a look-up table of skip and average count data determined from experiment as being appropriate for the number of detections. The number of detections to be averaged is also determined based on the number of optical pointer detections in the previous frame. This number is approximately two-thirds of the number of optical pointer detections in the previous frame, and is also preferably determined from a look-up table. The set-up of the detection interrupt routine also includes clearing the number of lines detected count, the number of lines skipped before averaging count, the number of lines averaged count, the number of lines skipped after averaging count, the number of last line detected, the first line averaged, and the last line averaged. Finally, the set-up also includes resetting the interrupt states when the optical pointer pulse pattern is determined to have ended, generally considered to occur if the difference between the current line number being drawn and the number of the last line detected is greater than twelve. If vertical retrace occurs and there are no optical pointer detections, a special code is generated to indicate that the optical pointer is directed away from the screen.

It is understood that the invention is not confined to the particular embodiment described and illustrated herein, but embraces such modified forms thereof as come within the scope of the following claims.

We claim:

1. Apparatus for use in locating a spot on a video screen which is scanned in a raster, comprising:
   (a) an optical pointer including a photodetector responsive to light, a lens for focusing a portion of the image of a plurality of raster lines from the screen on the photodetector, and detection means responsive to the photodetector for providing an output signal pulse corresponding to the incidence of light from a raster line on the photodetector;
   (b) signal processing means, responsive to the detected raster line output signal from the optical pointer and to the vertical and horizontal video signals controlling the display on the video screen for a frame of raster lines, for determining an averaged vertical and horizontal position with respect to the screen of the video image of a plurality of the detected raster lines incident on the photodetector during a frame of raster lines and providing an output signal indicative thereof.

2. The apparatus of claim 1 wherein the signal processing means ignores the signals corresponding to a selected number of detected raster lines from the optical pointer at the beginning and end of a group of raster line portions in determining the averaged horizontal position of the detected raster lines in each frame incident on the photodetector.

3. The apparatus of claim 1 wherein the signal processing means receives horizontal synchronization pulses and includes:
   means responsive to the optical pointer pulses and to the horizontal synchronization pulses to provide a timing pulse extending in duration from the initiation of the optical pointer pulse to the initiation of the horizontal synchronization pulse, whereby the timing pulse will be proportional in duration to the distance from the portion of the raster line providing the optical pointer signal to the edge of the video screen, means for providing short duration count pulses proportional in number to the duration of the timing pulse, and means for counting the count pulses and providing an output signal indicative of the number of such pulses and thereby indicative of the relative horizontal position of the detected raster line.

4. The apparatus of claim 3 wherein the signal processing means receives vertical synchronization pulses and includes means for counting the number of horizontal synchronization pulses between the vertical synchronization pulse at the beginning of a frame and each detected raster line pulse to provide a number for each detected raster line which is proportional to its vertical position in the frame on the video screen.

5. The apparatus of claim 1 wherein the detection means includes an amplifier connected to the photodetector to amplify the output thereof, a high pass filter for blocking the DC and low frequency noise components of the output of the amplifier and passing the higher frequency signal components, and a comparator which provides an output pulse when the signal passed through the high pass filter exceeds in magnitude a selected signal level.

6. The apparatus of claim 5 wherein the photodetector is a photodiode.

7. The apparatus of claim 1 including a video display terminal connected to provide vertical and horizontal deflection signals to the signal processing means, and a computer connected to receive the output signal from the signal processing means and connected to the video display terminal to control the image on the screen thereof, the computer utilizing the horizontal and vertical position indicative output signal from the signal processing means to cause the video display terminal to display a spot on the video screen at the position determined by the signal processing means.

8. The apparatus of claim 3 wherein the means for counting the count pulses sums the count pulses received during each timing pulse corresponding to a detected raster line to determine a sum of the count pulses for the plural detected raster lines, and wherein the signal processing means includes means for dividing the sum of the count pulses by the number of raster lines detected to provide a quotient which is indicative of the averaged horizontal position of the portion of the image from the screen incident on the photodector.

9. The apparatus of claim 8 wherein the sum of the count pulses is multiplied by a chosen number before division by the number of raster lines detected.

10. The apparatus of claim 8 wherein the signal processing means provides no count pulses to the means for counting during the timing pulses corresponding to a selected number of the detected raster lines at the beginning and end of a group of detected raster lines incident on the photodetector.

11. The apparatus of claim 10 wherein the signal processing means receives vertical synchronization pulses and includes means for counting the number of horizontal synchronization pulses between the vertical synchronization pulse at the beginning of a frame and each detected raster line to provide a number for each detected raster line which is proportional to its vertical position in the frame on the video screen, and wherein the signal processing means adds the numbers of the first and last raster lines for which count pulses were provided to the means for counting to provide a sum which is indicative of the averaged vertical position of the portion of the image from the screen incident on the photodetector.

12. The apparatus of claim 11 wherein the signal processing means subtracts the number of raster lines detected before the first raster line counted from and adds the number of raster lines detected after the last raster line counted to the sum indicative of averaged vertical position and provides an output signal indicative thereof.

13. The apparatus of claim 10 wherein the selected number of detected raster lines for which no count pulses are provided to the means for counting is determined as a function of the number of raster lines detected in the preceding group of raster lines detected.

14. The apparatus of claim 11 wherein the signal processing means provides an output signal indicative of average vertical and horizontal position for each frame of raster lines scanned on the video screen, and wherein the output signal for each frame will indicate the same averaged vertical and horizontal position as the output signal provided for the previous frame unless the horizontal and vertical positions determined by the signal processing means for the present frame differs from the horizontal and vertical positions of the preceding frame by more than a selected amount.

15. Apparatus for use in locating a spot on a video screen which is scanned in a raster, comprising:
 (a) an optical pointer including a lens focusing a portion of the video field from the screen and means for detecting a portion of the image as focused by the lens and providing a pulse signal when a raster line image is detected;
 (b) means for timing the pulses produced by the optical pointer from detected raster lines with respect to the horizontal synchronization signal of the video screen indicating the end of each horizontal raster line; and
 (c) means for averaging the times between the beginning of the detected raster pulses and the horizontal synchronization signals for a plurality of raster lines in a frame of raster lines to provide an estimate of the position of the detected portion of the screen.

16. The apparatus of claim 15 including means for timing a selected plurality of detected raster line pulses with respect to the vertical synchronization signal of the video screen for each frame of the video image, and means for averaging the times between the vertical synchronization signal and the detected raster lines to provide an estimated average vertical position of the detected area of each video frame.

17. The apparatus of claim 16 wherein the means for timing the selected detected raster line pulses with respect to the vertical synchronization signal counts the number of horizontal sychronization pulses between the vertical synchronization pulse and each selected raster line pulse.

18. Apparatus for use in locating a spot on a video screen which is scanned in a raster to provide a frame of background light intendity covering the screen, comprising:
 (a) an optical pointer including a lens focusing a portion of the video field from the screen and means for detecting a portion of the image as focused by the lens and providing a pulse output signal when each raster line passes through the detected portion of the image field.
- (b) means for timing a selected plurality of the pulses produced from detected raster lines with respect to the vertical synchronization signal of the video screen for each frame of the video image; and
- (c) means for averaging the times between the selected plurality of detected raster line pulses in a frame of raster lines and the vertical synchronization signal to provide an estimate of the average vertical position of the detected portion of the screen.

19. The apparatus of claim 18 wherein the means for timing the selected detected raster line pulses with respect to the vertical synchronization signal counts the number of horizontal synchronization pulses between the vertical synchronization pulse and each selected raster line pulse.

20. A method of locating a particular spot on a video screen which is scanned in a raster, comprising the steps of:
- (a) focusing a portion of the video field from the screen;
- (b) detecting a portion of the focused image from the video screen and providing a pulse output signal when a raster line passes through the detected portion of the field;
- (c) timing the pulses produced from the detected raster lines with respect to the horizontal synchronization signal of the video screen indicating the end of each horizontal line; and
- (d) averaging the times between the beginning of detected raster lines pulses and the horizontal synchronization signal for a plurality of raster lines in a frame of raster lines to provide an estimate of the position of the detected portion of the screen.

21. The method of claim 20 including the additional steps of:
- (1) timing a selected plurality of detected raster line pulses with respect to the vertical synchronization signal in each frame of the video image;
- (2) averaging the times between the vertical synchronization signal and the plurality of detected raster lines to provide an estimated average vertical position of the detected portion of the screen.

22. The method of claim 21 including the additional step of displaying a spot at the estimated horizontal and vertical positions of the detected portion of the screen.

23. A method of locating a particular spot on a video screen, comprising the steps of:
- (a) scanning the screen in a raster to provide a frame of background light intensity covering the screen;
- (b) focusing a portion of the video field from the screen;
- (c) detecting a portion of the focused image from the video screen and providing a pulse output signal when each raster line passes through the detected portion of the field;
- (d) timing a selected plurality of the pulses produced from detected raster lines with respect to the vertical synchronization signal of the video screen for each frame of the video image; and
- (e) averaging the times between selected plurality of detected raster line pulses and the vertical synchronization signal in a frame of raster lines to provide an estimate of the average vertical position of the detected portion of the screen.

* * * * *